United States Patent
Lee et al.

(10) Patent No.: US 10,616,924 B2
(45) Date of Patent: Apr. 7, 2020

(54) METHOD AND APPARATUS FOR CONTROLLING BACKOFF PROCEDURE FOR COVERAGE ENHANCEMENT IN WIRELESS COMMUNICATION SYSTEM

(71) Applicant: LG ELECTRONICS INC., Seoul (KR)

(72) Inventors: Jaewook Lee, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/758,703

(22) PCT Filed: Oct. 10, 2016

(86) PCT No.: PCT/KR2016/011311
§ 371 (c)(1),
(2) Date: Mar. 8, 2018

(87) PCT Pub. No.: WO2017/065468
PCT Pub. Date: Apr. 20, 2017

(65) Prior Publication Data
US 2018/0249510 A1    Aug. 30, 2018

Related U.S. Application Data

(60) Provisional application No. 62/241,741, filed on Oct. 14, 2015.

(51) Int. Cl.
*H04W 74/08* (2009.01)
*H04W 4/06* (2009.01)
(Continued)

(52) U.S. Cl.
CPC ......... *H04W 74/0833* (2013.01); *H04W 4/06* (2013.01); *H04W 4/70* (2018.02);
(Continued)

(58) Field of Classification Search
None
See application file for complete search history.

(56) References Cited

U.S. PATENT DOCUMENTS

2015/0016312 A1* 1/2015 Li ............................ H04L 5/14
370/280
2015/0036617 A1* 2/2015 Guo .................. H04W 74/0833
370/329

FOREIGN PATENT DOCUMENTS

WO    2015083997    6/2015

OTHER PUBLICATIONS

Nokia, NPL, "Random Access Procedure for Enhanced Coverage UEs" pp. 1-2 (Year: 2015).*
(Continued)

*Primary Examiner* — Ayanah S George
(74) *Attorney, Agent, or Firm* — Lee Hong Degerman Kang Waimey

(57) ABSTRACT

A method and apparatus for controlling a backoff procedure for coverage enhancement (CE) in a wireless communication system is provided. A user equipment (UE) performs a random access procedure in a first CE level, determines to select a random access resource associated with a second CE level, sets a backoff parameter to zero for the second CE level, and performs the random access procedure in the second CE level.

6 Claims, 5 Drawing Sheets

(51) Int. Cl.
  H04W 4/70    (2018.01)
  H04W 24/02   (2009.01)
  H04W 24/08   (2009.01)
  H04W 48/08   (2009.01)
  H04W 48/10   (2009.01)
(52) U.S. Cl.
  CPC ........... *H04W 24/02* (2013.01); *H04W 24/08* (2013.01); *H04W 48/08* (2013.01); *H04W 48/10* (2013.01)

(56) References Cited

OTHER PUBLICATIONS

PCT International Application No. PCT/KR2016/011311, International Search Report dated Jan. 11, 2017, 2 pages.
Nokia, "Random access procedure for enhanced coverage UEs", 3GPP TSG RAN WG2 Meeting #91bis, R2-154559, Oct. 2015, 4 pages.
Ericsson, "Remaining issues on random access for Rel-13 low complexity and enhanced coverage UEs", 3GPP TSG RAN WG2 Meeting #91bis, R2-154788, Oct. 2015, 10 pages.
3rd Generation Partnership Project (3GPP), "Technical Specification Group Radio Access Network; Evolved Universal Terrestrial Radio Access (E-UTRA); Medium Access Control (MAC) protocol specification (Release 12)," Section 5.1 of 3GPP TS 36.321 V12.7.0, Sep. 2015, 10 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Section 10.1.5 of 3GPP TS 36.300 V13.1.0, Sep. 2015, 18 pages.

* cited by examiner

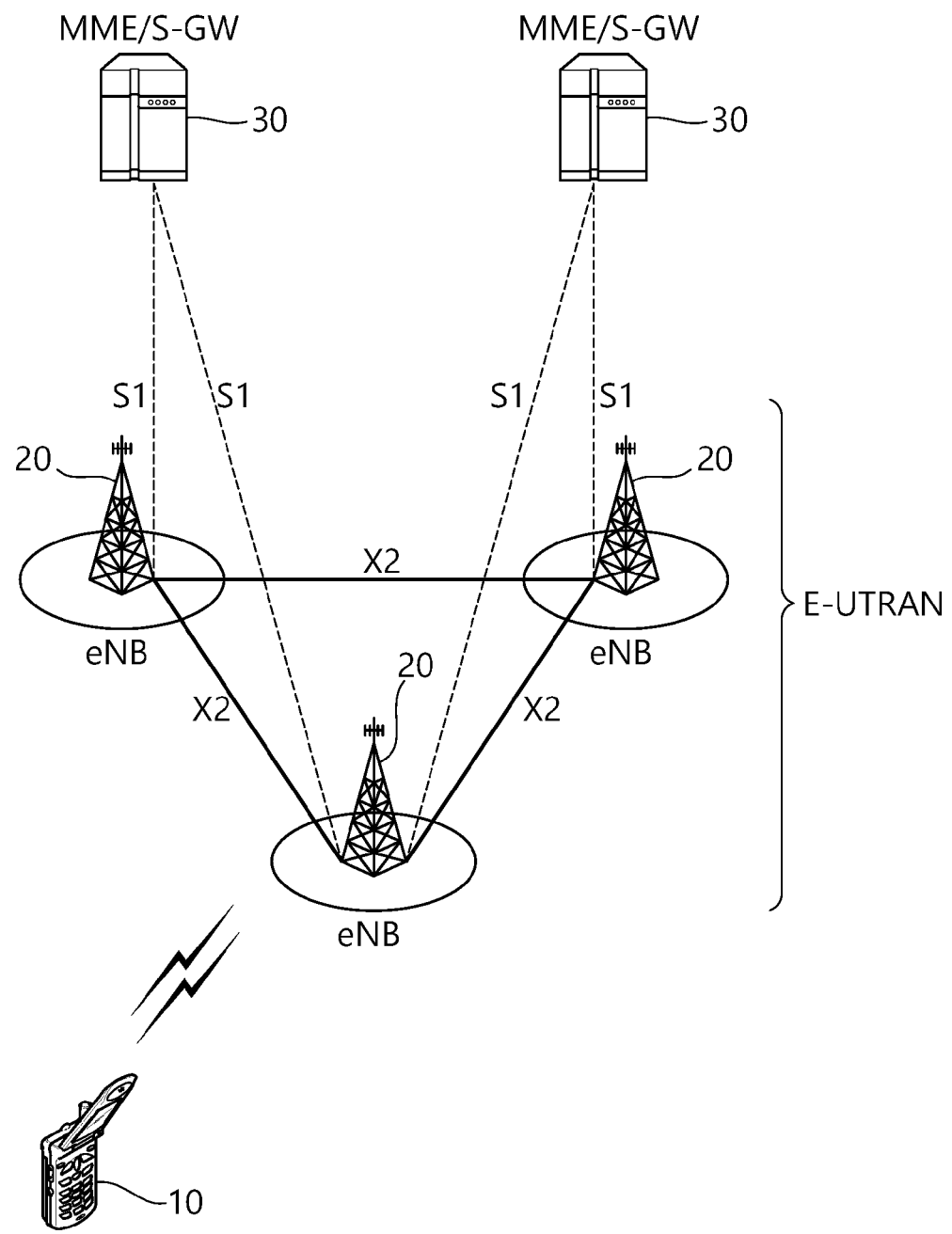
[Fig. 1]

[Fig. 2]
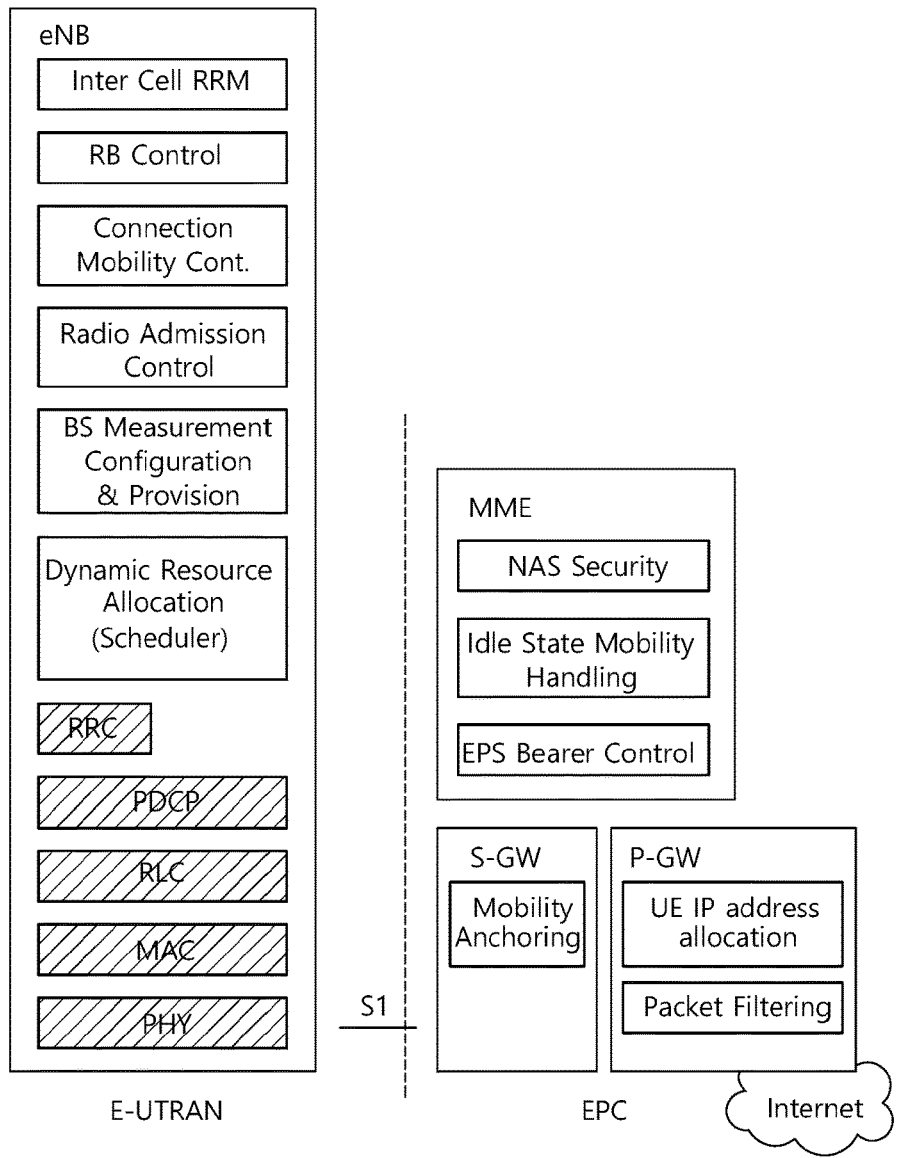
[Fig. 3]
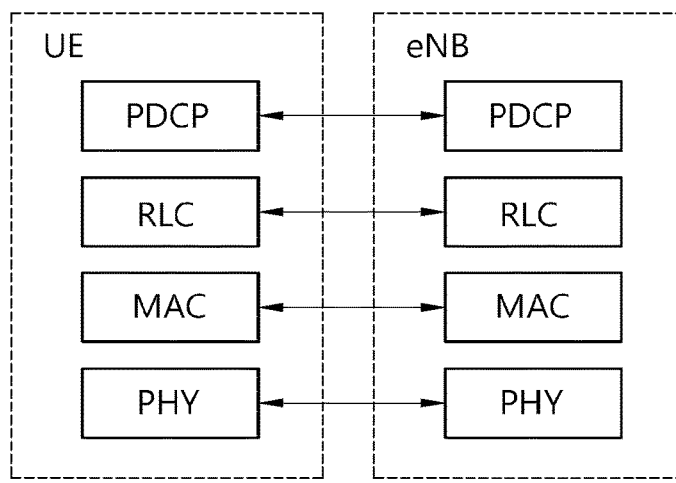

[Fig. 4]
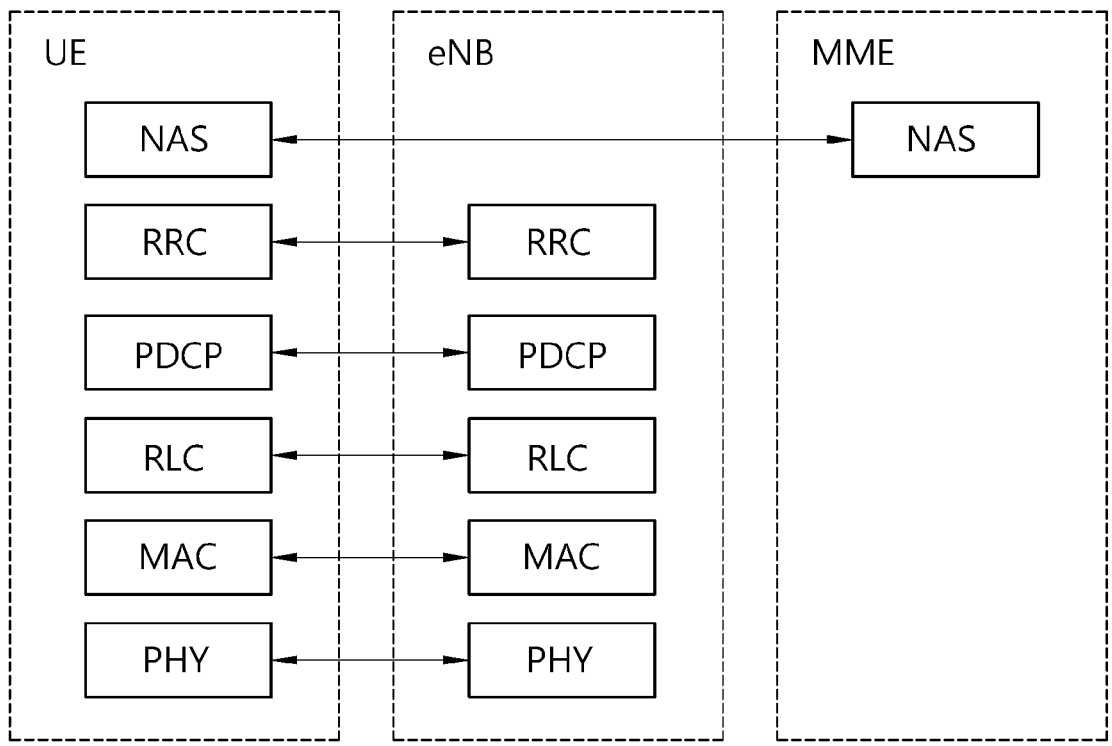
[Fig. 5]
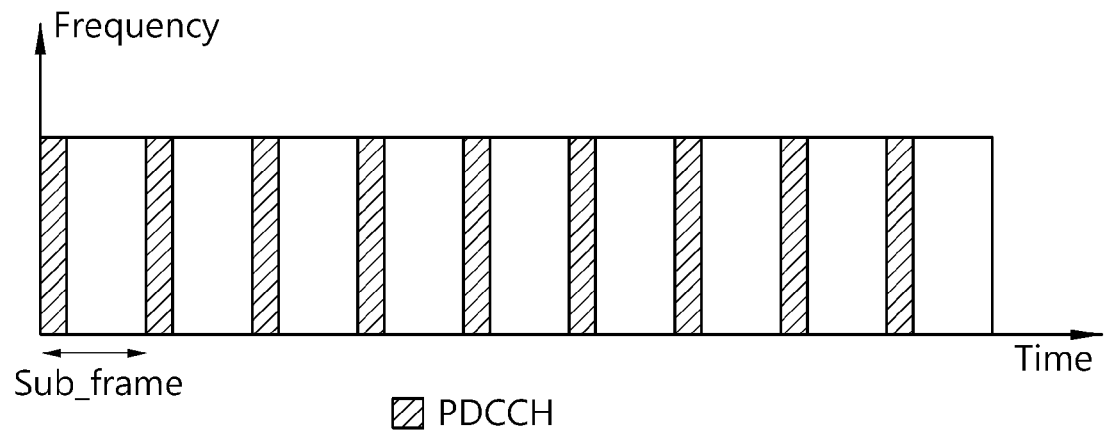

[Fig. 6]
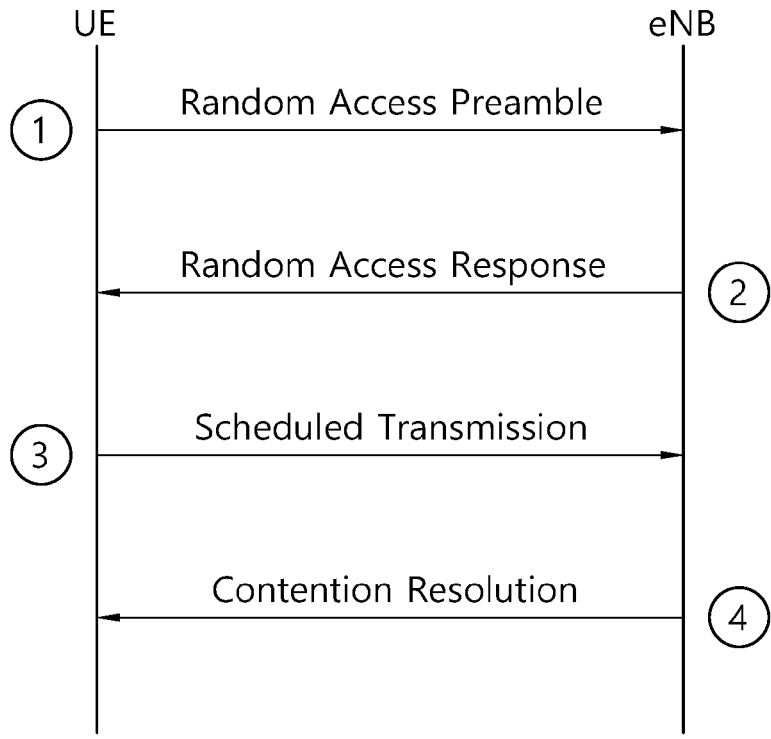
[Fig. 7]
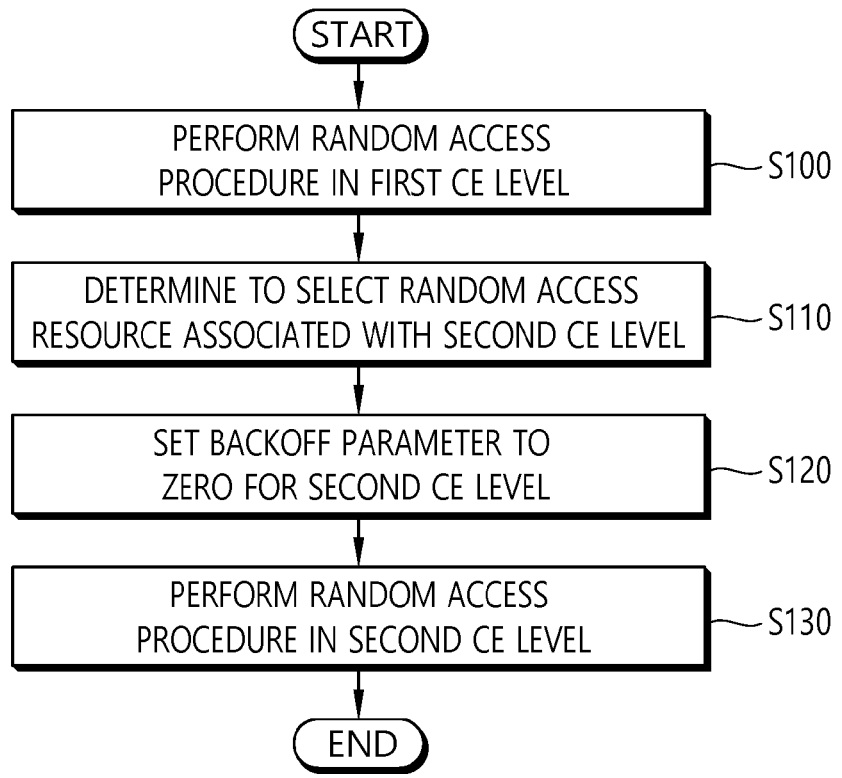

[Fig. 8]
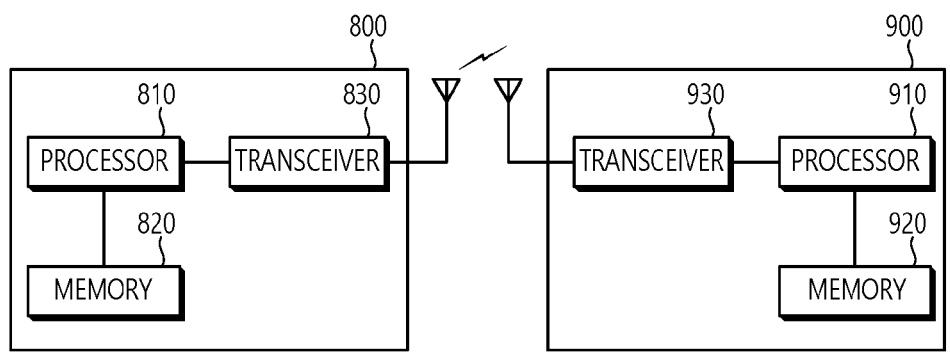

METHOD AND APPARATUS FOR CONTROLLING BACKOFF PROCEDURE FOR COVERAGE ENHANCEMENT IN WIRELESS COMMUNICATION SYSTEM

BACKGROUND OF THE INVENTION

Field of the Invention

The present invention relates to wireless communications, and more particularly, to a method and apparatus for controlling a backoff procedure for coverage enhancement in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

In order to be synchronized with the network, random access channel (RACH) procedure is used. Suppose a UE wants to access the network, so first it will try to attach or synchronize with the network. In LTE, a separate channel, i.e. physical random access channel (PRACH) is provided for initial access to the network.

Random access procedure may be performed for low complexity UE or MTC UEs, and in this case, a new feature for the random access procedure may be introduced. Accordingly, the random access procedure can be enhanced.

SUMMARY OF THE INVENTION

The present invention provides a method and apparatus for controlling a backoff procedure for coverage enhancement in a wireless communication system.

In an aspect, a method for controlling a backoff procedure by a user equipment (UE) for coverage enhancement (CE) in a wireless communication system is provided. The method includes performing a random access procedure in a first CE level m, determining to select a random access resource associated with a second CE level, setting a backoff parameter to zero for the second CE level, and performing the random access procedure in the second CE level.

In another aspect, a user equipment (UE) in a wireless communication system is provided. The UE includes a memory, a transceiver, and a processor, coupled to the memory and the transceiver, that performs a random access procedure in a first coverage enhancement (CE) level, determines to select a random access resource associated with a second CE level, sets a backoff parameter to zero for the second CE level, and performs the random access procedure in the second CE level.

Unnecessary backoff procedure can be avoided.

BRIEF DESCRIPTION OF THE DRAWINGS

FIG. 1 shows LTE system architecture.
FIG. 2 shows a block diagram of architecture of a typical E-UTRAN and a typical EPC.
FIG. 3 shows a block diagram of a user plane protocol stack of an LTE system.
FIG. 4 shows a block diagram of a control plane protocol stack of an LTE system.
FIG. 5 shows an example of a physical channel structure.
FIG. 6 shows a contention based random access procedure.
FIG. 7 shows a method for controlling a backoff procedure for CE according to an embodiment of the present invention.
FIG. 8 shows a wireless communication system to implement an embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the 01-DMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, an uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Low complexity UEs are targeted to low-end (e.g. low average revenue per user, low data rate, delay tolerant) applications, e.g. some machine-type communications (MTC). A low complexity UE indicates UE category 0 and has reduced Tx and Rx capabilities compared to other UE of different categories. A low complexity UE may access a cell only if system information block type 1 (SIB1) indicates that access of low complexity UEs is supported. If the cell does not support low complexity UEs, a low complexity UE considers the cell as barred.

For one type of low complexity UEs, a bandwidth reduced low complexity (BL) UE can operate in any LTE system bandwidth but with a limited channel bandwidth of 6 PRBs (corresponding to the maximum channel bandwidth available in a 1.4 MHz LTE system) in DL and UL. A BL UE may access a cell only if master information block (MIB) indicates that access of BL UEs is supported. The UE considers the cell as barred if the cell does not support BL UEs. A BL UE receives a separate occurrence of system information blocks (sent using different time/frequency resources). A BL UE has a transport block (TB) size limited to 1000 bit for broadcast and unicast. The SIB transmission occasions within an SI-window are provided in the SIB1 specific for BL UEs. The UE determines the TBS of SIB1 specific for BL UEs based on information in MIB. The BCCH modification period for BL UEs is a multiple of the BCCH modification period provided in SIB2. A BL UE can acquire SI messages across SI windows. A BL UE is not required to detect SIB change when in RRC_CONNECTED. A set of physical random access channel (PRACH) resources (e.g. time, frequency, preamble), each associated with the coverage enhancement (CE) level (or, enhanced coverage (EC) level) for BL UEs in normal coverage, is provided in SIB.

Number of PRACH repetitions and number of maximum preamble transmission attempts for BL UEs in normal coverage are provided in SIB. Time/frequency resources and repetition factor for random access response messages for BL UEs are derived from the used PRACH resources.

For other type of low complexity UEs, a UE in enhanced coverage is a UE that requires the use of coverage enhancement techniques to access the cell. A UE may access a cell using enhanced coverage techniques only if MIB indicates that access of UEs in enhanced coverage is supported. A UE in enhanced coverage receives a separate occurrence of system information blocks (sent using different time/frequency resources). The separate occurrence of SIB1 for UEs in enhanced coverage is identical to the separate occurrence of SIB1 for BL UEs. A UE in enhanced coverage has a transport block (TB) size limited to 1000 bit for broadcast and unicast. The SIB transmission occasions within an SI-window are provided in the SIB1 specific for UEs in enhanced coverage. The BCCH modification period used for UEs in enhanced coverage is a multiple of the BCCH modification period provided in SIB2. A UE in enhanced coverage can acquire SI messages across SI windows. A UE capable of enhanced coverage acquires, if needed, and uses legacy system information when operating in normal coverage if it is not a BL UE. A UE capable of enhanced coverage acquires, if needed, and uses system information specific for UEs operating in enhanced coverage. A UE in enhanced coverage is not required to detect SIB change when in RRC_CONNECTED.

A set of PRACH resources (e.g. time, frequency, preamble), each associated with a CE level, is provided in SIB. Number of PRACH repetitions and number of maximum preamble transmission attempts per CE level are provided in SIB. UEs operating in the same CE level use random access resources associated with the same CE level. Time/frequency resources and repetition factor for random access response messages for UEs in enhanced coverage are derived from the used PRACH resources.

A UE in RRC_IDLE does not inform the network when it changes the CE level within a cell or when it changes to another cell. The UE shall re-select to inter-frequency cells in which it is able to operate in normal coverage over cells in which it has to be in enhanced coverage.

Random access procedure is described. It may be referred to as Section 10.1.5 of 3GPP TS 36.300 V13.1.0 (2015-09) and Section 5.1 of 3GPP TS 36.321 V12.7.0 (2015-09). The random access procedure is performed for the following events related to the primary cell (PCell):
  Initial access from RRC_IDLE;
  RRC connection re-establishment procedure;
  Handover;
  DL data arrival during RRC_CONNECTED requiring random access procedure (e.g. when UL synchronization status is "non-synchronized");
  UL data arrival during RRC_CONNECTED requiring random access procedure (e.g. when UL synchronization status is "non-synchronized" or there are no PUCCH resources for scheduling request (SR) available);
  For positioning purpose during RRC_CONNECTED requiring random access procedure (e.g. when timing advance is needed for UE positioning).

The random access procedure is also performed on a secondary cell (SCell) to establish time alignment for the corresponding secondary timing advance group (sTAG).

In dual connectivity, the random access procedure is also performed on at least primary SCell (PSCell) upon secondary cell group (SCG) addition/modification, if instructed, or upon DL/UL data arrival during RRC_CONNECTED requiring random access procedure. The UE initiated random access procedure is performed only on PSCell for SCG.

Furthermore, the random access procedure takes two distinct forms:
  Contention based (applicable to first five events);
  Non-contention based (applicable to only handover, DL data arrival, positioning and obtaining timing advance alignment for a sTAG).

Normal DL/UL transmission can take place after the random access procedure.

The random access procedure is initiated by a PDCCH order, by the MAC sublayer itself or by the RRC sublayer. Random access procedure on a SCell shall only be initiated by a PDCCH order. If a MAC entity receives a PDCCH transmission consistent with a PDCCH order masked with its cell radio network temporary identity (C-RNTI), and for a specific serving cell, the MAC entity shall initiate a random access procedure on this serving cell. For random access on the special cell (SpCell) a PDCCH order or RRC optionally indicate the ra-PreambleIndex and the ra-PRACH-MaskIndex; and for random access on a SCell, the PDCCH order indicates the ra-PreambleIndex with a value different from 000000 and the ra-PRACH-MaskIndex. For the pTAG preamble transmission on PRACH and reception of a PDCCH order are only supported for SpCell.

The random access procedure shall be performed as follows:
  Flush the Msg3 buffer;
  set the PREAMBLE_TRANSMISSION_COUNTER to 1;
  set the backoff parameter value to 0 ms;
  proceed to the selection of the random access resource.
The random access resource selection procedure shall be performed as follows:
  1> If ra-PreambleIndex (random access preamble) and ra-PRACH-MaskIndex (PRACH mask index) have been explicitly signalled and ra-PreambleIndex is not 000000:
    2> the random access preamble and the PRACH mask index are those explicitly signalled.
  1> else the random access preamble shall be selected by the MAC entity as follows:
    2> If Msg3 has not yet been transmitted, the MAC entity shall:
      3> if random access preambles group B exists and if the potential message size (UL data available for transmission plus MAC header and, where required, MAC control elements) is greater than messageSizeGroupA and if the pathloss is less than $P_{CMAX,c}$ (of the serving cell performing the random access procedure)—preambleInitialReceivedTargetPower—deltaPreambleMsg3—messagePowerOffsetGroupB, then:
        4> select the random access preambles group B;
      3> else:
        4> select the random access preambles group A.
    2> else, if Msg3 is being retransmitted, the MAC entity shall:
      3> select the same group of random access preambles as was used for the preamble transmission attempt corresponding to the first transmission of Msg3.
    2> randomly select a random access preamble within the selected group. The random function shall be such that each of the allowed selections can be chosen with equal probability;
    2> set PRACH mask index to 0.

1> determine the next available subframe containing PRACH permitted by the restrictions given by the prach-ConfigIndex, the PRACH mask index and physical layer timing requirements (a MAC entity may take into account the possible occurrence of measurement gaps when determining the next available PRACH subframe);
1> if the transmission mode is time division duplex (TDD) and the PRACH mask index is equal to zero:
2> if ra-PreambleIndex was explicitly signalled and it was not 000000 (i.e., not selected by MAC):
3> randomly select, with equal probability, one PRACH from the PRACHs available in the determined subframe.
2> else:
3> randomly select, with equal probability, one PRACH from the PRACHs available in the determined subframe and the next two consecutive subframes.
1> else:
2> determine a PRACH within the determined subframe in accordance with the requirements of the PRACH mask index.
1> proceed to the transmission of the random access preamble.

FIG. 6 shows a contention based random access procedure. The four steps of the contention based random access procedures are as follows:

(1) Random access preamble on RACH in UL: The random access preamble may be called as different names, i.e. preamble, physical random access channel (PRACH) preamble or message 1 (Msg 1). There are two possible groups defined and one is optional. If both groups are configured, the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.

(2) Random access response (RAR) generated by media access control (MAC) on DL-SCH: The RAR may be called as different names, i.e. message 2 (Msg 2). The characteristics of the RAR may be as follows.

Semi-synchronous (within a flexible window of which the size is one or more TTI) with message 1;
No HARQ;
Addressed to random access RNTI (RA-RNTI) on PDCCH;
Conveys at least RA-preamble identifier, timing alignment information for the primary timing advance group (pTAG), initial UL grant and assignment of temporary C-RNTI (which may or may not be made permanent upon Contention Resolution);
Intended for a variable number of UEs in one DL-SCH message.

RAR reception is described in detail. Once the random access preamble is transmitted and regardless of the possible occurrence of a measurement gap, the MAC entity shall monitor the PDCCH of the SpCell for RAR(s) identified by the RA-RNTI defined below, in the RA response window which starts at the subframe that contains the end of the preamble transmission plus three subframes and has length ra-ResponseWindowSize subframes. The RA-RNTI associated with the PRACH in which the random access preamble is transmitted, is computed as: RA-RNTI=1+t_id+10*f_id, where t_id is the index of the first subframe of the specified PRACH ($0 \leq t\_id < 10$), and f_id is the index of the specified PRACH within that subframe, in ascending order of frequency domain ($0 \leq f\_id < 6$). The MAC entity may stop monitoring for RAR(s) after successful reception of a RAR containing random access preamble identifiers that matches the transmitted random access preamble.

1> If a DL assignment for this TTI has been received on the PDCCH for the RA-RNTI and the received TB is successfully decoded, the MAC entity shall regardless of the possible occurrence of a measurement gap:
2> if the RAR contains a backoff indicator subheader:
3> set the backoff parameter value as indicated by the BI field of the backoff indicator subheader.
2> else, set the backoff parameter value to 0 ms.
2> if the RAR contains a random access preamble identifier corresponding to the transmitted random access preamble, the MAC entity shall:
3> consider this RAR reception successful and apply the following actions for the serving cell where the random access preamble was transmitted:
4> process the received timing advance command;
4> indicate the preambleInitialReceivedTargetPower and the amount of power ramping applied to the latest preamble transmission to lower layers (i.e., (PREAMBLE_TRANSMISSION_COUNTER−1)*powerRampingStep);
4> process the received UL grant value and indicate it to the lower layers;
3> if ra-PreambleIndex was explicitly signalled and it was not 000000 (i.e., not selected by MAC):
4> consider the random access procedure successfully completed.
3> else, if the random access preamble was selected by the MAC entity:
4> set the temporary C-RNTI to the value received in the RAR message no later than at the time of the first transmission corresponding to the UL grant provided in the RAR message;
4> if this is the first successfully received RAR within this random access procedure:
5> if the transmission is not being made for the CCCH logical channel, indicate to the multiplexing and assembly entity to include a C-RNTI MAC control element (CE) in the subsequent UL transmission;
5> obtain the MAC PDU to transmit from the multiplexing and assembly entity and store it in the Msg3 buffer.
If no RAR is received within the RA response window, or if none of all received RARs contains a random access preamble identifier corresponding to the transmitted random access preamble, the RAR reception is considered not successful and the MAC entity shall:
1> if the notification of power ramping suspension has not been received from lower layers:
2> increment PREAMBLE_TRANSMISSION_COUNTER by 1;
1> If PREAMBLE_TRANSMISSION_ COUNTER= preambleTransMax+1:
2> if the random access preamble is transmitted on the SpCell:
3> indicate a random access problem to upper layers;
2> if the random access preamble is transmitted on an SCell:
3> consider the random access procedure unsuccessfully completed.
1> if in this random access procedure, the random access preamble was selected by MAC:
2> based on the backoff parameter, select a random backoff time according to a uniform distribution between 0 and the backoff parameter value;
2> delay the subsequent random access transmission by the backoff time;
1> proceed to the selection of a random access resource.

(3) First scheduled UL transmission on UL-SCH: The first scheduled UL transmission may be called as different names, i.e. message 3 (Msg 3). The characteristics of the message 3 may be as follows.

Uses HARQ;

Size of the transport blocks depends on the UL grant conveyed in RAR.

For initial access, the message 3 conveys the RRC connection request generated by the RRC layer and transmitted via CCCH, and conveys at least NAS UE identifier but no NAS message.

For RRC connection re-establishment procedure, the message 3 conveys the RRC connection re-establishment request generated by the RRC layer and transmitted via CCCH and does not contain any NAS message.

After handover, in the target cell, the message 3 conveys the ciphered and integrity protected RRC handover confirm generated by the RRC layer and transmitted via DCCH, and conveys the C-RNTI of the UE (which was allocated via the handover command) Further, the message 3 includes an UL buffer status report when possible.

For other events, the message 3 conveys at least the C-RNTI of the UE.

(4) Contention resolution on DL: The contention resolution message may be called as different names, i.e. message 4 (Msg 4). The characteristics of the message 4 may be as follows.

Early contention resolution shall be used, i.e. eNB does not wait for NAS reply before resolving contention;

Not synchronized with message 3;

HARQ is supported;

Addressed to the temporary C-RNTI on PDCCH for initial access and after radio link failure, or the C-RNTI on PDCCH for UE in RRC_CONNECTED.

HARQ feedback is transmitted only by the UE which detects its own UE identity, as provided in message 3, echoed in the contention resolution message;

Random access procedure may be performed for low complexity UEs, including BL UEs and/or UEs in enhanced coverage. When the UE is a BL UE or a UE in enhanced coverage, the random access resources may be configured per CE level. That is, random access resources corresponding to each CE level may be different from each other. Random access procedure may be performed per CE level. Accordingly, the congestion level on random access resources associated with each CE level may be different from each other. Thus, when CE level of the UE changes during on-going random access procedure, the UE may not need to perform backoff procedure for random access procedure in new CE level unnecessarily, if the UE had received backoff parameter. However, UE operation regarding not performing backoff procedure has not been defined currently.

FIG. 7 shows a method for controlling a backoff procedure for CE according to an embodiment of the present invention. In this embodiment, it is assumed that random access resource sets (e.g. preamble, time/frequency resource) and corresponding PRACH repetition factors (i.e. PRACH repetition numbers) are different from each other for each CE level. And accordingly, it is assumed that RAR time/frequency resources and RAR repetition factors (either for PDSCH or MTC PDCCH (M-PDCCH)) are also different from each other for each CE level. The UE may determine its CE level and select corresponding random access resource.

In step S100, the UE performs a random access procedure in a first CE level. In step S110, the UE determines to select a random access resource associated with a second CE level, i.e. new CE level. The UE may determine to select a random access resource associated with the second level in an ongoing random access procedure when the number of random access preamble transmissions at a certain CE level reaches the maximum number of random access preamble transmission attempts per CE level, or when the UE determines that CE level changes during the random access procedure. The initial counter value may be set to 1, and the UE may increase the counter value for counting the number of random access preamble transmissions when the contention resolution is considered not successful, or when no RAR is received within the RA Response window, or when none of all received RAR(s) contains a random access preamble identifier corresponding to the transmitted random access preamble.

The UE may determine the CE level as follows. The thresholds for determining the CE level may be provided by the serving cell.

(1) Reference signal received power (RSRP)/Reference signal received quality (RSRQ) based: During the measurement of the serving cell and neighbor cell, the UE may determine the CE level for the cells by comparing the measured RSRP/RSRQ result with the configured RSRP/RSRQ threshold values. The network may configure RSRP/RSRQ threshold values for multiple CE levels for the UE to determine its CEL level in a certain cell. For instance, the network may configure RSRP/RSRQ_threshold0 for CE level 0, RSRP/RSRQ_threshold1 for CE level 1, RSRP/RSRQ_threshold2 for CE level 2 and RSRP/RSRQ_threshold3 for CE level 3. In this case, CE level 0 may correspond to no CE for measurement. If the measured RSRP/RSRQ result is higher than RSRP/RSRQ_threshold0, the UE may determine its CE level as CE level 0. If the measured RSRP/RSRQ result is lower than RSRP/RSRQ_threshold0 and higher than RSRP/RSRQ_threshold1, the UE may determine its CE level as CE level 1, and so on.

(2) Primary synchronization signal (PSS)/secondary synchronization signal (SSS)/PDCCH based: During the measurement of the serving cell and neighbor cell, the UE may determine the CE level for the cells by comparing time (or repetition number) taken to acquire PSS/SSS (or to decode PDCCH) with the configured time threshold values. The network may configure time threshold values for multiple CE levels for the UE to determine its CE level in a certain cell. For instance, the network may configure time_threshold0 for CE level 0, time_threshold1 for CE level 1, time_threshold2 for CE level 2 and time_threshold3 for CE level 3. In this case, CE level 0 may correspond to no CE for measurement. If the measured time is shorter than time_threshold0, the UE may determine its CE level as CE level 0. If the measured time is longer than time_threshold0 and shorter than time_threshold1, the UE may determine its CE level as CE level 1, and so on.

Any DL message based: The UE may determine the CE level for the cells by comparing repetition number taken to receive any DL message with the configured threshold values.

In step S120, the UE sets a backoff parameter to zero for the second CE level. That is, the UE performing the random access procedure in CE mode may set the backoff parameter value to 0 ms, when the UE determines to select a random access resource (preamble and/or time/frequency resource) associated with a new CE level in an ongoing random access procedure. In step S130, the UE performs the random access procedure in the second CE level.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method performed by a user equipment (UE) for coverage enhancement (CE) in a wireless communication system, the method comprising:
    selecting a first preamble and a first frequency resource for a first CE level;
    performing a random access procedure in the first CE level by transmitting the first preamble on the first frequency resource;
    detecting changes from the first CE level to a second CE level during the random access procedure, by comparing time taken to acquire a primary synchronization signal (PSS) or a secondary synchronization signal (SSS) with a configured threshold value for the second CE level;
    selecting a second preamble and a second frequency resource for the second CE level,
    wherein the second frequency resource is different from the first frequency resource;
    setting a time value of a backoff parameter to zero for the second CE level; and
    performing the random access procedure in the second CE level by transmitting the second preamble on the second frequency resource, upon setting the time value of the backoff parameter to zero,
    wherein the UE is one of a low complexity UE, a bandwidth reduced low complexity (BL) UE, or a UE in an enhanced coverage.

2. The method of claim 1, wherein it is determined to select the frequency resource for the second CE level when a number of random access preamble transmission in the first CE level reaches a maximum number of preamble transmission attempts for the first CE level.

3. The method of claim 1, wherein a repetition number for the random access procedure in the first CE level and a repetition number for the random access procedure in the second CE level are different from each other.

4. The method of claim 1, wherein the selecting the frequency resource for the second CE level comprises determining the second CE level.

5. The method of claim 4, wherein the second CE level is determined by comparing a repetition number required to receive a downlink (DL) message with a configured threshold value for the second CE level.

6. A user equipment (UE) in a wireless communication system, the UE comprising:
    a memory;
    a transceiver; and
    a processor, coupled to the memory and the transceiver, that:
        selects a first preamble and a first frequency resource for a first coverage enhancement (CE) level;
        performs a random access procedure in the first CE level, by transmitting the first preamble on the first frequency resource,
        detects changes from the first CE level to a second CE level during the random access procedure by comparing time taken to acquire a primary synchronization signal (PSS) or a secondary synchronization signal (SSS) with a configured threshold value for the second CE level;
        selects a second preamble and a second frequency resource for the second CE level, wherein the second frequency resource is different from the first frequency resource,
        sets a time value of a backoff parameter to zero for the second CE level, and
        performs the random access procedure in the second CE level by transmitting the second preamble on the second frequency resource, upon setting the time value of the backoff parameter to zero,
        wherein the UE is one of a low complexity UE, a bandwidth reduced low complexity (BL) UE, or a UE in an enhanced coverage.

* * * * *